(12) United States Patent
Itagaki et al.

(10) Patent No.: US 10,834,768 B2
(45) Date of Patent: Nov. 10, 2020

(54) WIRELESS APPARATS AND WIRELESS APPARATUS PROCESSING METHOD TO ENHANCE TIME SYNCHRONIZATION ACCURACY BETWEEN A PLURALITY OF WIRELESS APPARATUSES IN A WIRELESS NETWORK

(71) Applicant: SONY CORPORATION, Tokyo (JP)

(72) Inventors: Takeshi Itagaki, Saitama (JP); Hideyuki Suzuki, Tokyo (JP); Junji Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/330,310

(22) PCT Filed: Nov. 7, 2017

(86) PCT No.: PCT/JP2017/040135
§ 371 (c)(1),
(2) Date: Mar. 4, 2019

(87) PCT Pub. No.: WO2018/088402
PCT Pub. Date: May 17, 2018

(65) Prior Publication Data
US 2019/0261439 A1 Aug. 22, 2019

(30) Foreign Application Priority Data
Nov. 10, 2016 (JP) .................................. 2016-219313

(51) Int. Cl.
*H04W 76/14* (2018.01)
*H04W 76/11* (2018.01)
(Continued)

(52) U.S. Cl.
CPC .......... *H04W 76/14* (2018.02); *H04W 56/002* (2013.01); *H04W 56/0015* (2013.01);
(Continued)

(58) Field of Classification Search
None
See application file for complete search history.

(56) References Cited

U.S. PATENT DOCUMENTS

2009/0290511 A1 11/2009 Budampati et al.
2009/0290572 A1 11/2009 Gonia et al.
(Continued)

FOREIGN PATENT DOCUMENTS

CN 102118697 A 7/2011
CN 102246443 A 11/2011
(Continued)

OTHER PUBLICATIONS

International Search Report and Written Opinion of PCT Application No. PCT/JP2017/040135, dated Feb. 6, 2018, 09 pages of ISRWO.

(Continued)

*Primary Examiner* — Ahn Ngoc M Nguyen
(74) *Attorney, Agent, or Firm* — Chip Law Group

(57) ABSTRACT

To enhance a time synchronization accuracy between a plurality of wireless apparatuses in a wireless network. A time synchronization processing part performs a time synchronization processing between a self-apparatus and other apparatus configuring a wireless network together with the self-apparatus. A parent/child determination part determines whether the self-apparatus is a parent node or a child node in the wireless network. The time synchronization processing part performs the time synchronization processing as clock master for a child node under control when the self-apparatus is a parent node, and performs the time synchronization processing as a clock slave for a parent node when the self-apparatus is a child node.

15 Claims, 15 Drawing Sheets

(51) Int. Cl.
*H04W 56/00* (2009.01)
*H04W 92/18* (2009.01)
*H04W 84/12* (2009.01)

(52) U.S. Cl.
CPC ............ *H04W 76/11* (2018.02); *H04W 92/18* (2013.01); *H04W 84/12* (2013.01)

(56) References Cited

U.S. PATENT DOCUMENTS

| | | | |
|---|---|---|---|
| 2011/0051754 A1 | 3/2011 | Lansdowne | |
| 2011/0149816 A1 | 6/2011 | Saito et al. | |
| 2011/0255546 A1* | 10/2011 | Le Pallec | H04J 3/0679 370/400 |
| 2013/0128116 A1 | 5/2013 | Knowles | |
| 2013/0148639 A1 | 6/2013 | Gao et al. | |
| 2013/0185373 A1 | 7/2013 | Vandwalle et al. | |
| 2013/0301474 A1 | 11/2013 | Suwa | |
| 2014/0226639 A1 | 8/2014 | Yi et al. | |
| 2015/0092640 A1* | 4/2015 | Mandiganal | H04W 52/02 370/311 |
| 2016/0198317 A1* | 7/2016 | Li | H04W 4/08 370/312 |
| 2019/0007801 A1* | 1/2019 | Chaki | H04B 17/318 |

FOREIGN PATENT DOCUMENTS

| | | |
|---|---|---|
| CN | 102577194 A | 7/2012 |
| CN | 103081383 A | 5/2013 |
| CN | 103828449 A | 5/2014 |
| EP | 2377256 A1 | 10/2011 |
| FR | 2939587 A1 | 6/2010 |
| JP | 2012-511849 A | 5/2012 |
| JP | 5279152 B1 | 9/2013 |
| JP | 52791525 B2 | 9/2013 |
| JP | 2013-539638 A | 10/2013 |
| JP | 5343841 B2 | 11/2013 |
| JP | 2014-528217 A | 10/2014 |
| JP | 2015-128199 A | 7/2015 |
| JP | 2016-131332 A | 7/2016 |
| KR | 10-2011-0084982 A | 7/2011 |
| KR | 10-2013-0106354 A | 9/2013 |
| KR | 10-2014-0059220 A | 5/2014 |
| KR | 10-2014-0093217 A | 7/2014 |
| TW | 201342982 A | 10/2013 |
| WO | 2010/066664 A1 | 6/2010 |
| WO | 2011/025746 A1 | 3/2011 |
| WO | 2012/026935 A1 | 3/2012 |
| WO | 2013/036092 A2 | 3/2013 |
| WO | 2013/041829 A1 | 3/2013 |
| WO | 2013/106721 A1 | 7/2013 |
| WO | 2013/168830 A1 | 11/2013 |

OTHER PUBLICATIONS

Extended European Search Report of EP Application No. 17869725.6, dated Oct. 11, 2019, 10 pages.

\* cited by examiner

HOW NETWORK DELAY IS IN PACKET RELAYING

Best Master Clock algorithm (1/2)

Best Master Clock algorithm (2/2)

EXEMPLARY FORMATS OF PREVIOUS INFORMATION NOTIFICATION FRAME
FIG. 14A   IN Public action frame
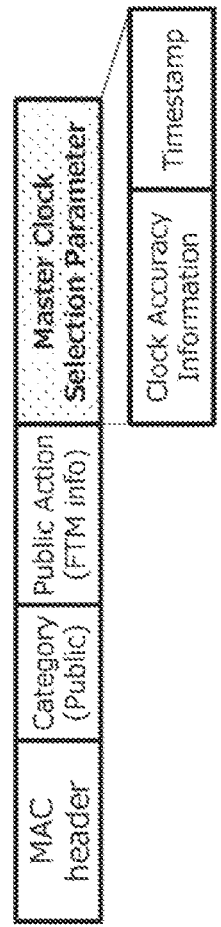
FIG. 14B   IN Association Req
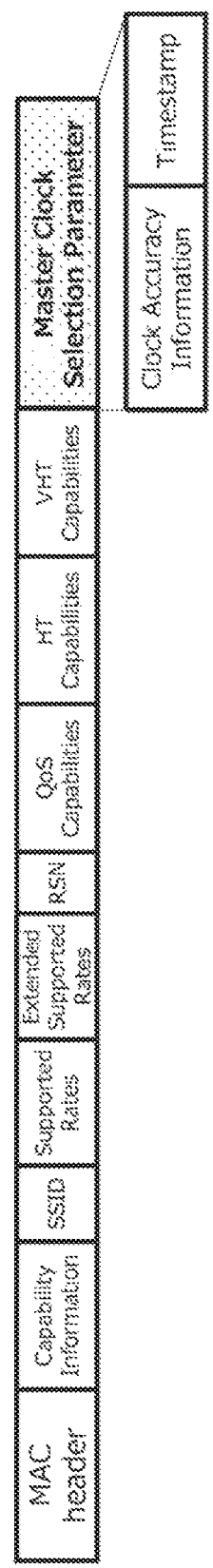

WIRELESS APPARATS AND WIRELESS APPARATUS PROCESSING METHOD TO ENHANCE TIME SYNCHRONIZATION ACCURACY BETWEEN A PLURALITY OF WIRELESS APPARATUSES IN A WIRELESS NETWORK

CROSS REFERENCE TO RELATED APPLICATIONS

This application is a U.S. National Phase of International Patent Application No. PCT/JP2017/040135 filed on Nov. 7, 2017, which claims priority benefit of Japanese Patent Application No. JP 2016-219313 filed in the Japan Patent Office on Nov. 10, 2016. Each of the above-referenced applications is hereby incorporated herein by reference in its entirety.

TECHNICAL FIELD

The present technology relates to a wireless apparatus, a wireless apparatus processing method, and a program.

BACKGROUND ART

Time synchronization between a plurality of wirelessly-connected apparatuses has been conventionally known (see Patent Document 1, for example). IEEE1588 precision time protocol (PTP), IEEE802.11 fine timing measurement (FTM), and the like are known as protocols for time synchronization. In the case of the protocols, a time offset observation accuracy influences on a time synchronization accuracy.

CITATION LIST

Patent Document

Patent Document 1: Japanese Patent Application Laid-Open No. 2016-131332

SUMMARY OF THE INVENTION

Problems to be Solved by the Invention

It is an object of the present technology to enhance a time synchronization accuracy between a plurality of wireless apparatuses in a wireless network.

Solutions to Problems

A concept of the present technology lies in a wireless apparatus including:

a time synchronization processing part configured to perform a time synchronization processing between a self-apparatus and other apparatus configuring a wireless network together with the self-apparatus; and a parent/child determination part configured to determine whether the self-apparatus is a parent node or a child node in the wireless network, in which the time synchronization processing part performs the time synchronization processing as a clock master for a child node under control when the self-apparatus is a parent node, and performs the time synchronization processing as a clock slave for a parent node when the self-apparatus is a child node.

According to the present technology, the time synchronization processing part performs a time synchronization processing between a self-apparatus and other apparatus configuring a wireless network together with the self-apparatus. For example, the time synchronization processing may be a time synchronization processing in the IEEE1588 precision time protocol (PTP) protocol. Further, for example, the time synchronization processing may be a time synchronization processing in the IEEE802.11 fine timing measurement (FTM) protocol.

The parent/child determination part determines whether the self-apparatus is a parent node or a child node in the wireless network. For example, the wireless network may be a Wi-Fi P2P network in which a P2P group owner as the parent node and a P2P client as the child node are present. Further, for example, the wireless network may be a network in the infrastructure mode in which an access point as the parent node and a station as the child node are present. The time synchronization processing part then performs the time synchronization processing as a clock master when the self-apparatus is a parent node, and performs the time synchronization processing as a clock slave when the self-apparatus is a child node.

In this way, according to the present technology, the parent node in the wireless network performs the time synchronization processing as a clock master. Thus, the time offset observation accuracy can be enhanced, and thus the time synchronization accuracy between a plurality of wireless apparatuses in the wireless network can be enhanced.

Additionally, according to the present technology, for example, there is further provided an information reception part configured to receive clock accuracy information and timestamp information sent from the other apparatus, and in a case where determining that a clock accuracy of the other apparatus is higher than a clock accuracy of the self-apparatus on the basis of the clock accuracy information sent from the other apparatus when the self-apparatus is a parent node, the time synchronization processing part may correct a clock value of the self-apparatus by use of the timestamp information sent from the other apparatus, and may then perform the time synchronization processing.

In this case, for example, the clock accuracy information and the timestamp information may be stored and transmitted in the IEEE802.11 Public Action Frame. Further, in this case, the clock accuracy information and the timestamp information are stored and transmitted in the IEEE802.11 Association Request Frame, for example.

In this way, in a case where the clock accuracy of the child node as clock slave is higher than the clock accuracy of the parent node as clock master, the clock value of the parent node is corrected, and then the time synchronization processing is performed, thereby reducing the possibilities that the wireless network is synchronized at a largely-different time from an outside time.

Further, according to the present embodiment, for example, there is further provided an information transmission part configured to transmit clock accuracy information and timestamp information to the other apparatus, and when the self-apparatus is a child node, clock accuracy information and timestamp information of the self-apparatus may be transmitted to other apparatus. In this case, for example, the clock accuracy information may indicate which a clock of the self-apparatus is set or updated with reference to. Further, in this case, for example, the timestamp information may indicate a clock value of the self-apparatus corresponding to a timing of the transmission.

Further, in this case, for example, the clock accuracy information and the timestamp information may be stored and transmitted in the IEEE802.11 Public Action Frame. Further, in this case, for example, the clock accuracy information and the timestamp information may be stored and transmitted in the IEEE802.11 Association Request Frame.

Effects of the Invention

According to the present technology, it is possible to enhance a time synchronization accuracy between a plurality of wireless apparatuses in a wireless network. Additionally, the effects described herein are not necessarily restrictive, and may be any effect described in the present disclosure.

BRIEF DESCRIPTION OF DRAWINGS

FIGS. 14A and 14B are diagrams illustrating exemplary formats of a previous information notification frame.

MODE FOR CARRYING OUT THE INVENTION

Modes for carrying out the invention (denoted as "embodiments" below) will be described below. Additionally, the description will be made in the following order.
1. Embodiments
2. Variant 1. Embodiments In a case where a plurality of apparatuses are connected to perform time synchronization, the IEEE1588 standard "1588-2008-IEEE Standard for a Precision Clock Synchronization Protocol for Networked Measurement and Control Systems" is defined as a time synchronization protocol via a network. The protocol in the standard is called precision time protocol (PTP).

Figure 1:
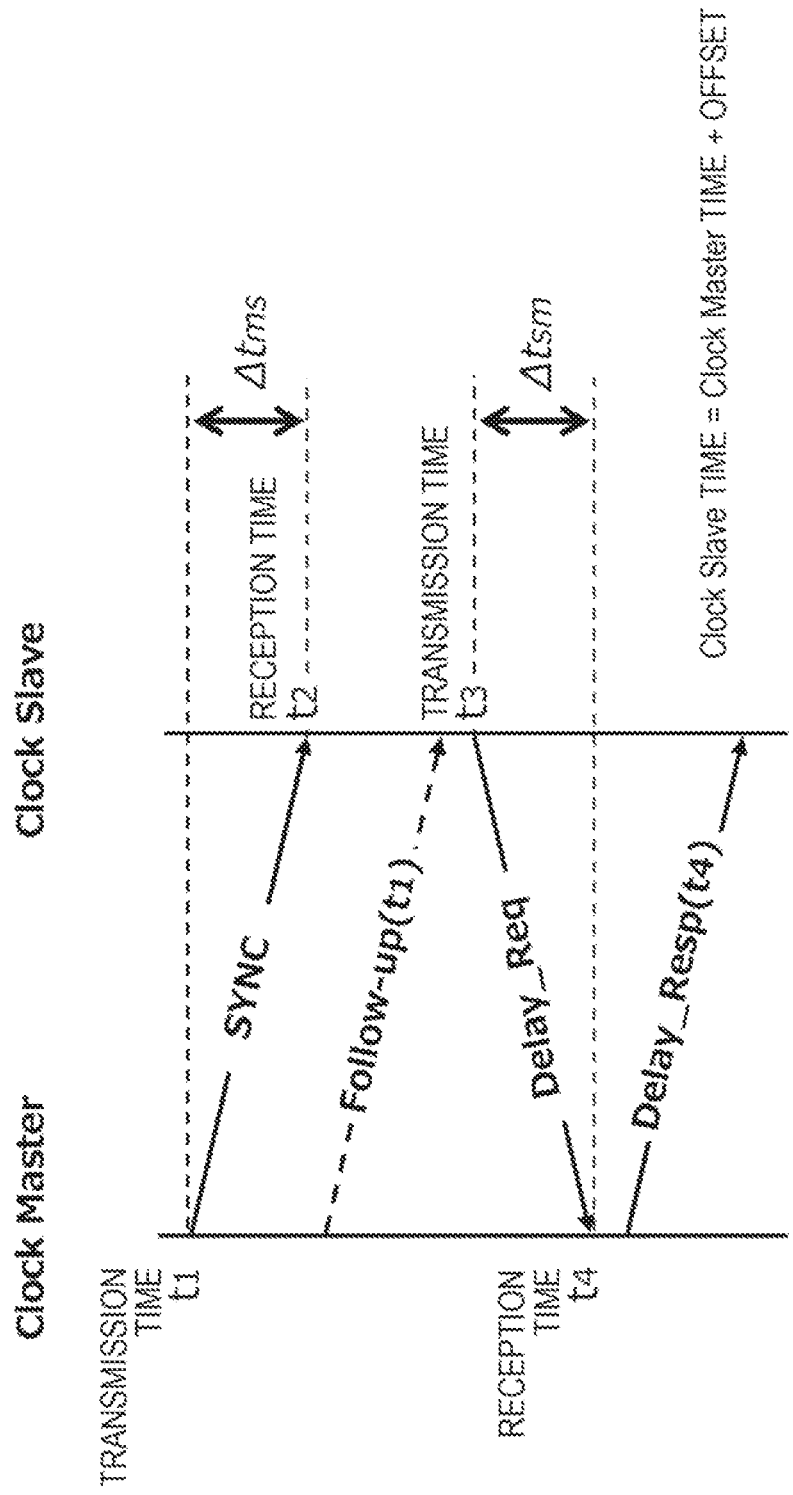
FIG. 1 is a diagram illustrating an operation outline of PTP.

FIG. 1 illustrates an operation outline of PTP. One of two apparatuses in the protocol is assumed as clock master and the other is assumed as clock slave. The two roles will be called clock role below. At first, the clock master transmits a correction value measurement SYNC frame to the clock slave. Then, the transmission time is assumed as "time t1." Time t1 is a measurement time in the clock master apparatus. Further, a time when the SYNC frame reaches the clock slave is assumed as "time t2." Time t2 is a measurement time in the clock slave apparatus.

The clock master then notifies the measured "time t1" to the clock slave in a Follow-up frame. Thereby, the clock slave can acquire a propagation delay time from the clock master to the clock slave. Consequently, the propagation delay time Δtms from the clock master to the clock slave is indicated in the following Equation (1).

[Math. 1]

$$\Delta tms = t_2 - t_1 = \text{Delay}(\text{Master} \rightarrow \text{Slave}) + \text{Offset} \ldots \quad (1)$$

The Delay_Request frame is then transmitted from the clock slave, and the transmission time "time t3" is measured. The clock master measures "time t4" when it receives the Delay_Request frame, and notifies the value in the Delay_Response frame to the clock slave. By doing so, the propagation delay time Δtsm from the clock slave to the clock master is indicated in the following Equation (2).

[Math. 2]

$$\Delta tsm = t_4 - t_3 = \text{Delay}(\text{Slave} \rightarrow \text{Master}) - \text{Offset} \ldots \quad (2)$$

The time offset value offset between the clock master and the clock slave is calculated as in the following Equation (3) due to Equation (1), Equation (2), and symmetry of the propagation path.

[Math. 3]

$$\text{offset} = \frac{1}{2} \{(t_2 - t_1) - (t_4 - t_3)\} \ldots \quad (3)$$

Therefore, if a propagation delay from the clock master to the clock slave or from the clock slave to the clock master is symmetric, and the frame exchange times (t1, t2, t3, t4) can be accurately measured, the offset value can be also derived at high accuracy.

A mechanism for calculating offset in PTP between two apparatuses has been described above. In a network in which three or more apparatuses are present, any one is assumed as grand master and the other apparatuses follow it. The grand master is a clock which is highly accurate and reliable as a reference source. In a case where an apparatus not directly connected to the grand master makes synchronization, clock information needs to be relayed.

Figure 2:
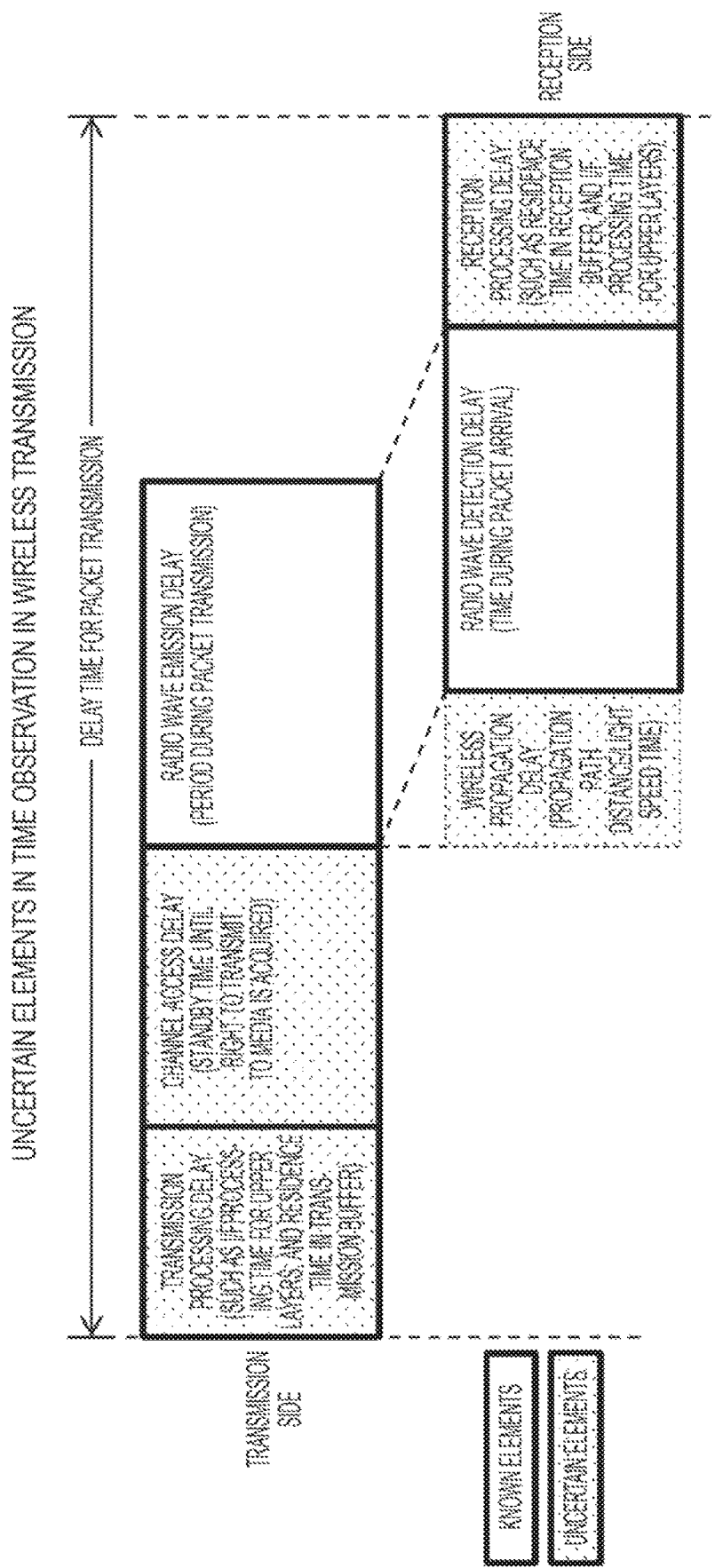
FIG. 2 is a diagram for explaining uncertain elements for time observation in wireless transmission.

In a case where PTP is performed via a wireless propagation path, a delay due to an uncertain element is present on time observation. FIG. 2 illustrates uncertain elements in time observation in wireless transmission. In a case where a PTP packet is transmitted via wireless LAN, a processing time changes due to system load in a case where the exchange processings are performed in software (transmission processing delay and reception processing delay in FIG. 2).

Further, carrier sensing is performed in a case where packets are transmitted via wireless LAN, and random backoff time standby is performed in a case where a wireless access of other station is detected, thereby preventing a collision by offsetting transmission timings of a plurality of hosts (channel access delay in FIG. 2). Thus, the timestamps do not necessarily indicate actual packet exchange times depending on a position of the processing layer for timestamps.

Figure 3:
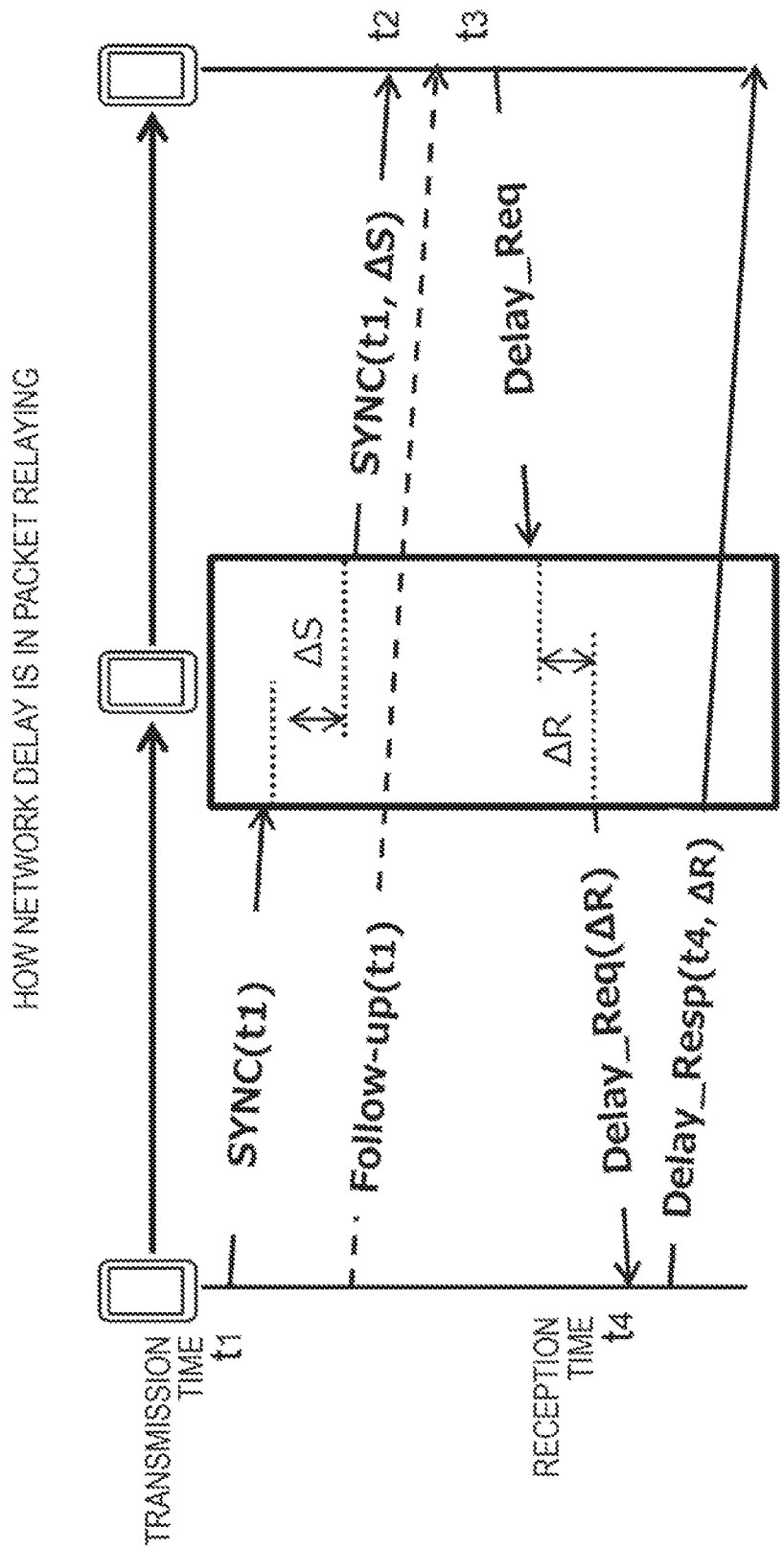
FIG. 3 is a diagram illustrating how a network delay is due to packet relaying.

Further, as illustrated in FIG. 3, a network delay varies due to a processing residence time (ΔS, ΔR) occurring in an intermediate network device for transferring packets, and the time offset observation accuracy lowers.

Therefore, a hardware support processing in the PHY layer (physical layer) is recommended in order to acquire accurate exchange times and to observe a time offset in the IEEE1588 specification. Further, a transparent clock (TC) function is defined as a switching hub for realizing a residence time correction function in an intermediate node. However, in a case where a device not for the measure is present together, a solution for reducing as many influences as possible is required.

Figure 4:
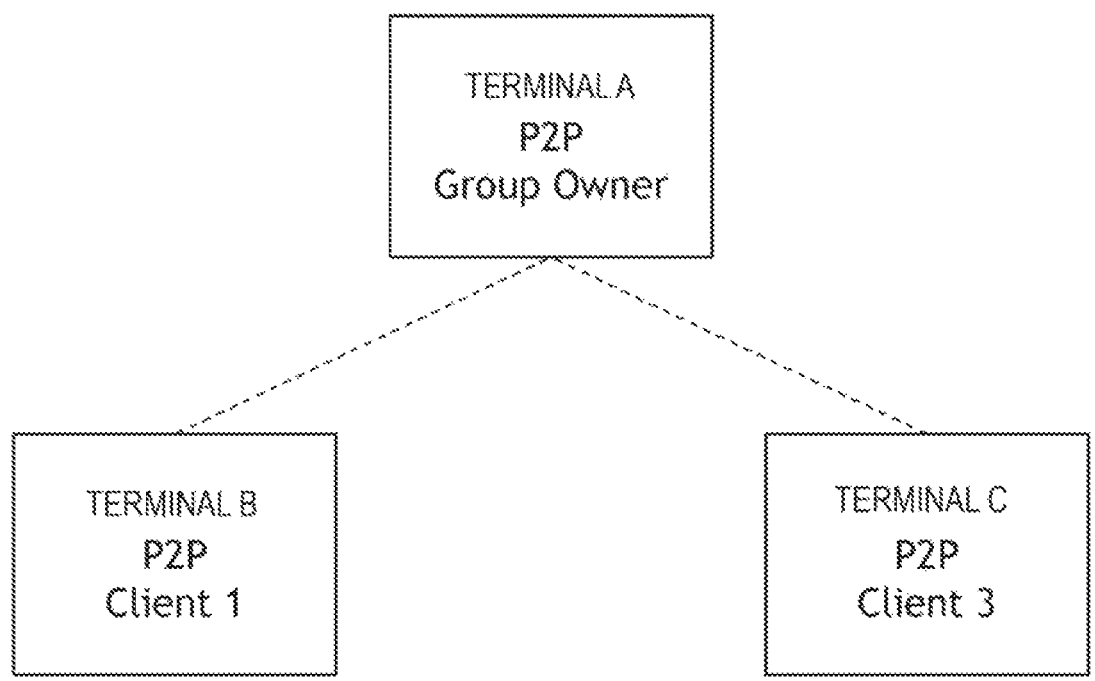
FIG. 4 is a diagram illustrating an exemplary topology in which a plurality of child nodes are connected to a parent node via Wi-Fi P2P.

For example, FIG. 4 illustrates an exemplary topology in which a plurality of child nodes are connected to a parent node via Wi-Fi P2P. The illustrated example assumes that P2P clients as a plurality of child nodes are connected to a P2P group owner as parent node.

As described in the specification of Japanese Patent Application No. 2012-224013 (Japanese Patent Application Laid-Open No. 2014-078785) previously filed by the present applicants, a P2P group owner may be determined depending on the characteristics of an application in a Wi-Fi P2P network.

In the case of the example illustrated in FIG. 4, a terminal A is determined as P2P group owner, and a terminal B and a terminal C are further determined as P2P clients. In this case, in a case where the terminal B as P2P client serves as the clock master in the time synchronization processing, the following disadvantages occur when time synchronization between the terminals is performed.

That is, direct communication is made between the terminal B and the terminal A in the time synchronization processing between the terminal B and the terminal A as described in the following (1). To the contrary, indirect communication is made between the terminal B and the terminal C via the terminal A in the time synchronization processing between the terminal B and the terminal C as described in the following (2).

(1) Synchronization between terminal B and terminal A: terminal B to terminal A
(2) Synchronization between terminal B and terminal C: terminal B to terminal A to terminal C When a comparison between (1) and (2) is made, (2) includes more wireless communication periods, and has a larger influence on the offset observation accuracy due to the residence time because of the presence of the intermediate node. Thus, the time offset observation accuracy is influenced by the network topology.

Incidentally, the IEEE1588 specification defines the best master selection function as a mechanism for selecting the clock master in the time synchronization processing. In the best master selection function, an apparatus present on a network reports to surroundings an attribute (Table 12 in the IEEE1588 specification (version 2008)) including its time accuracy in an announcement message, and selects a clock more suitable for the clock master on the basis of the clock comparison algorithm in the IEEE1588 specification.

Figure 5:
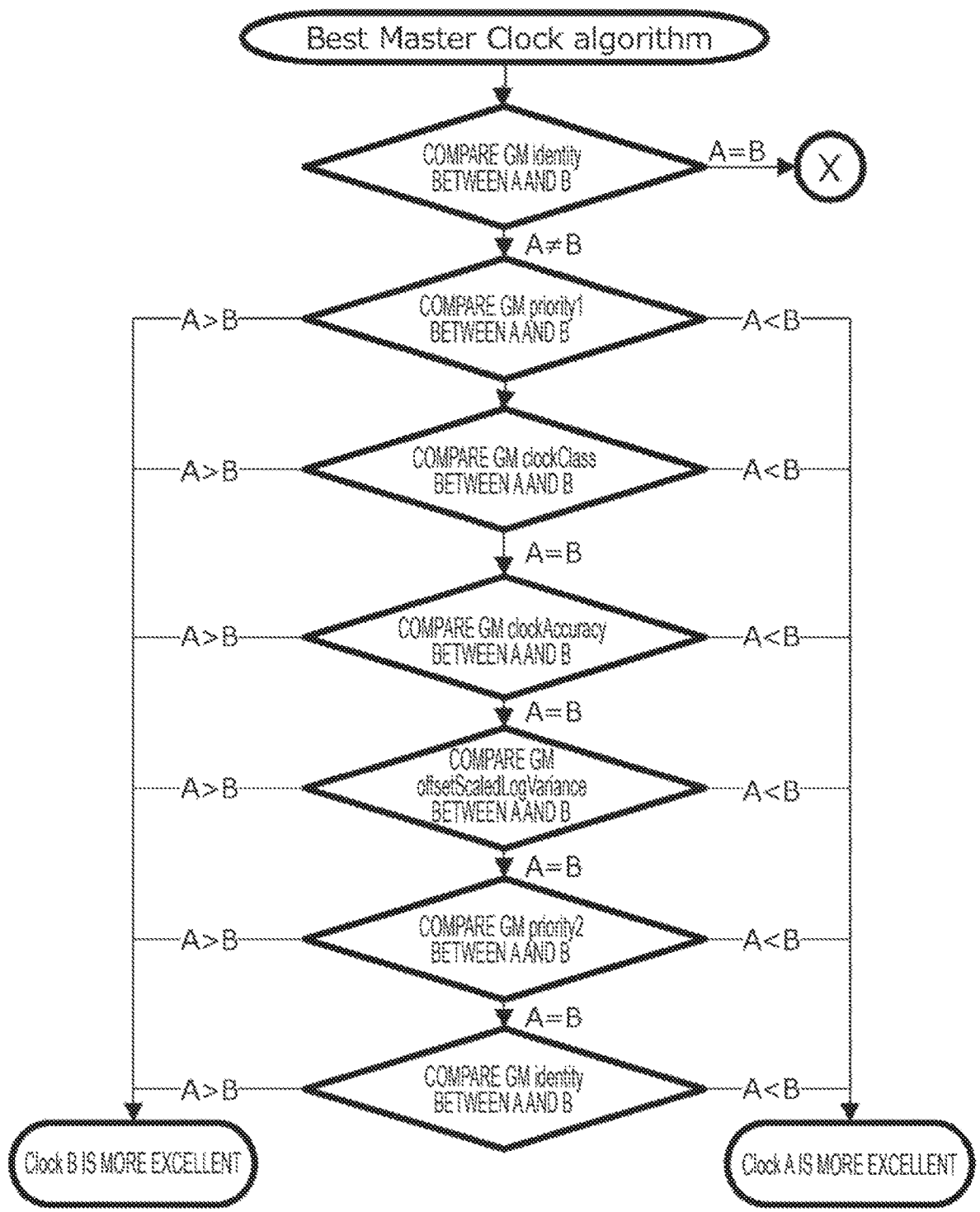
FIG. 5 is a diagram illustrating a clock comparison algorithm (1/2) used in the best master selection function defined in the IEEE1588.
Figure 6:
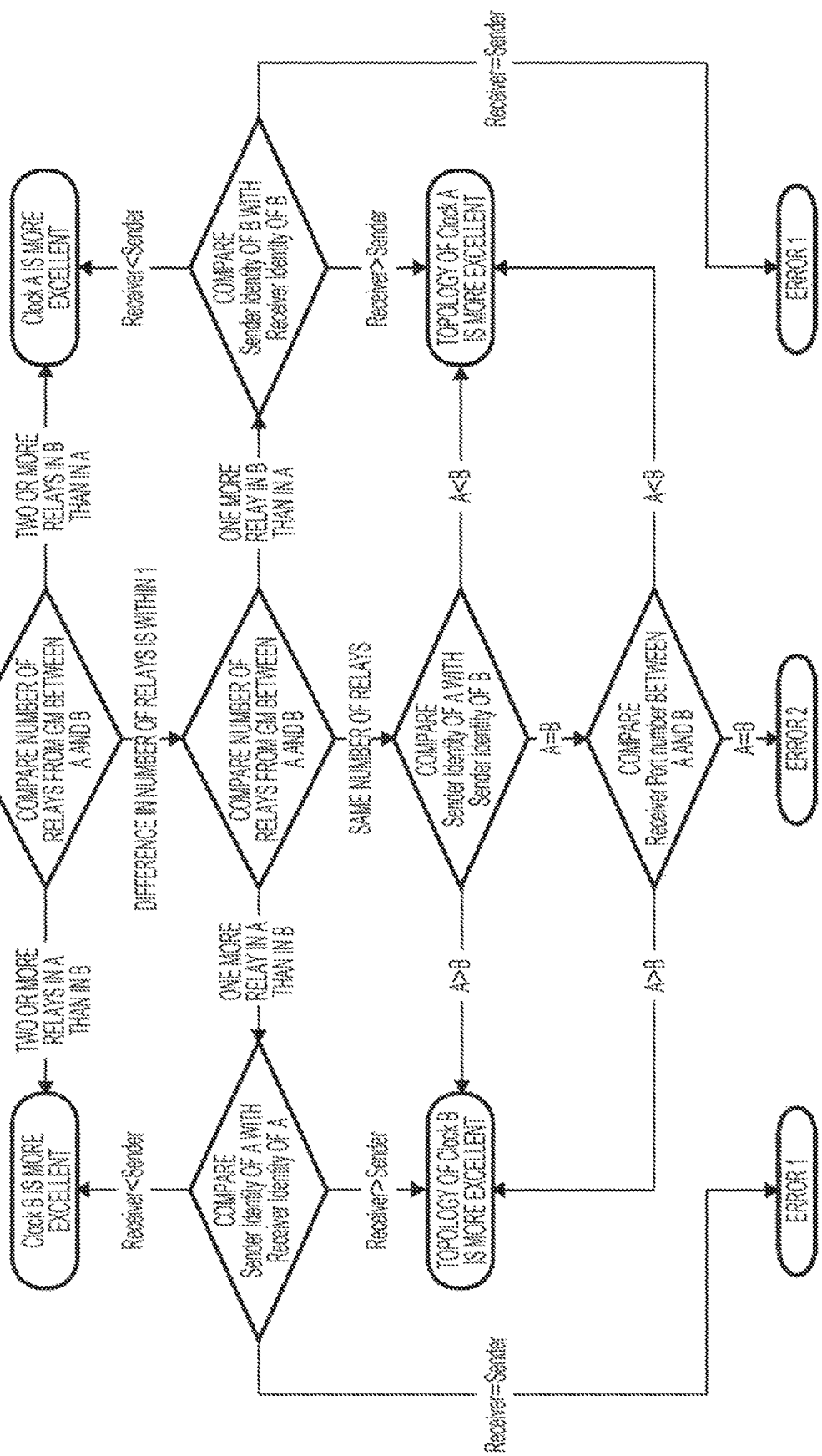
FIG. 6 is a diagram illustrating the clock comparison algorithm (2/2) used in the best master selection function defined in the IEEE1588.

Though not described in detail, FIG. 5 and FIG. 6 illustrate the clock comparison algorithm. FIG. 5 and FIG. 6 correspond to FIG. 27 "Data Set Comparison algorithm, part1", and FIG. 28 "Data Set Comparison algorithm, part2" in the IEEE1588 specification, respectively. There is known selection of a clock master on the basis of the time accuracy of each apparatus (each terminal) and the number of relays at the layer 3 (network layer) level, but a mechanism for selecting a clock master in consideration of the number of relays at the layer 2 (datalink layer) level is not conventionally present. In a case where wireless LAN is used for transmission, a relay at the layer 2 level is caused, and the problem arises.

In many cases, a terminal mounting a high-accuracy clock thereon and operating as grandmaster is additionally prepared in the current IEEE1588 specification and its implementation. However, it will be assumed in the future that each terminal mounts the grandmaster function in the IEEE1588 thereon, and any of mutually-connected terminals is in charge of the grandmaster function, thereby synchronizing between terminals in a closed network and without additionally preparing a grandmaster apparatus. In this case, it is assumed that a plurality of terminals having a similar level of clock accuracy are connected, and the offset observation accuracy due to a residence time in a wireless medium or an intermediate node is regarded as more serious than due to difference in accuracy of the clock mounted on each terminal.

In the case of the situation illustrated in FIG. 4, a start topology is formed about the P2P group owner as a parent node, and thus the terminal A as P2P group owner is selected as clock master. Such selection is made so that the numbers of hops from the clock master terminal to all the clock slave terminals are the same, and the same level of offset observation accuracy is obtained among all the P2P client devices due to the absence of an intermediate node.

Additionally, the Wi-Fi P2P network is described herein as a wireless network by way of example, but a start topology about an access point (AP) is formed also in a network in the infrastructure mode in which the access point (AP) as a parent node and a station (STA) as child node are present, and thus a similar configuration can be applied.

According to the present technology, a solution for dynamically selecting a terminal to be the clock master is introduced in consideration of a wireless topology in which terminals participating in a wireless network are currently configured.

Figure 7:
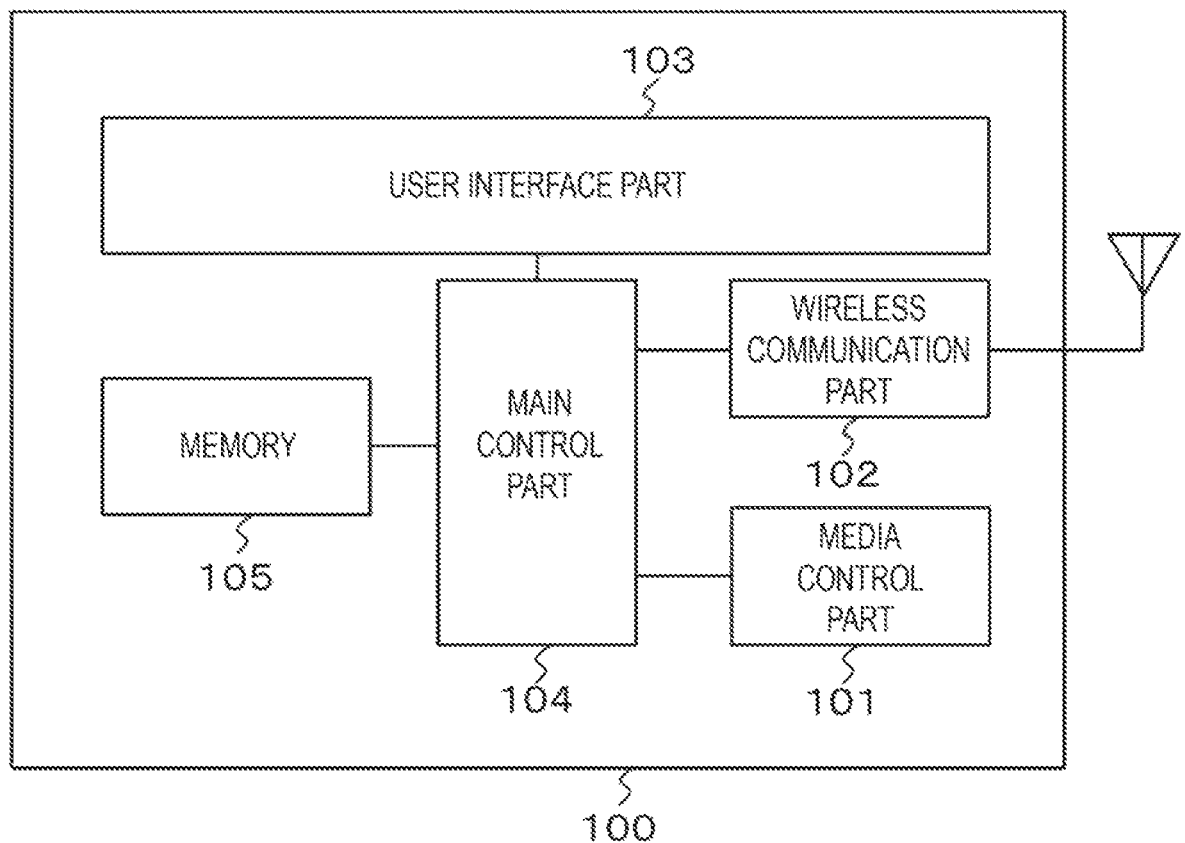
FIG. 7 is a functional bloc diagram of a terminal (wireless apparatus) configuring a wireless network.

FIG. 7 illustrates a functional block diagram of each terminal (wireless apparatus) 100 configuring a wireless network. The terminal 100 has a media control part 101, a wireless communication part 102, a user interface part 103, a main control part 104, and a memory 105.

The media control part 101 is a block having the functions such as a video control function of shooting an image or outputting an image, and a speech control function of collecting speech and outputting sounds, for example. The wireless communication part 102 is a functional block in charge of all the functions of a wireless protocol mainly in the communication layers below the datalink layer for packets generated in the main control part 104 or incoming wireless frames.

The user interface part 103 notifies a user-input operation signal to the main control part 104. The user interface part 103 may have a function of notifying an input from a sensor for collecting environment data to the main control part 104 in addition to operation signals. The main control part 104 corresponds to a host processor in the terminal 100, executes application programs held in the memory 105, controls input/output signals of the user interface part 103, and performs communication protocol processings mainly in the network layer and its upper layers. Further, the main control part 104 puts information in and out of the media control part 101.

A wireless stereo speaker is assumed as an exemplary use case in which the terminal (wireless apparatus) 100 of FIG. 7 is connected as in FIG. 4, for example. In the case, the terminal A is a parent node of audio, and the terminal B and the terminal C are stereo speakers for reproducing audio data in L channel or R channel transmitted by the terminal A, respectively.

Two embodiments will be described below. Though described below in detail, the following Table 1 is a summary of characteristics of each embodiment.

TABLE 1

| Embodiment | Applicable offset calculation protocol | Clock Master | Previous correction on Master side | Solution for Slave with higher Clock accuracy | Exchange information before Association |
|---|---|---|---|---|---|
| 1 | PTP of L3 or FTM of L2 | Parent node | No | x | No |
| 2 | PTP of L3 or FTM of L2 | Parent node | Yes | ◯ | Clock accuracy Timestamp |

First Embodiment

Figure 8:
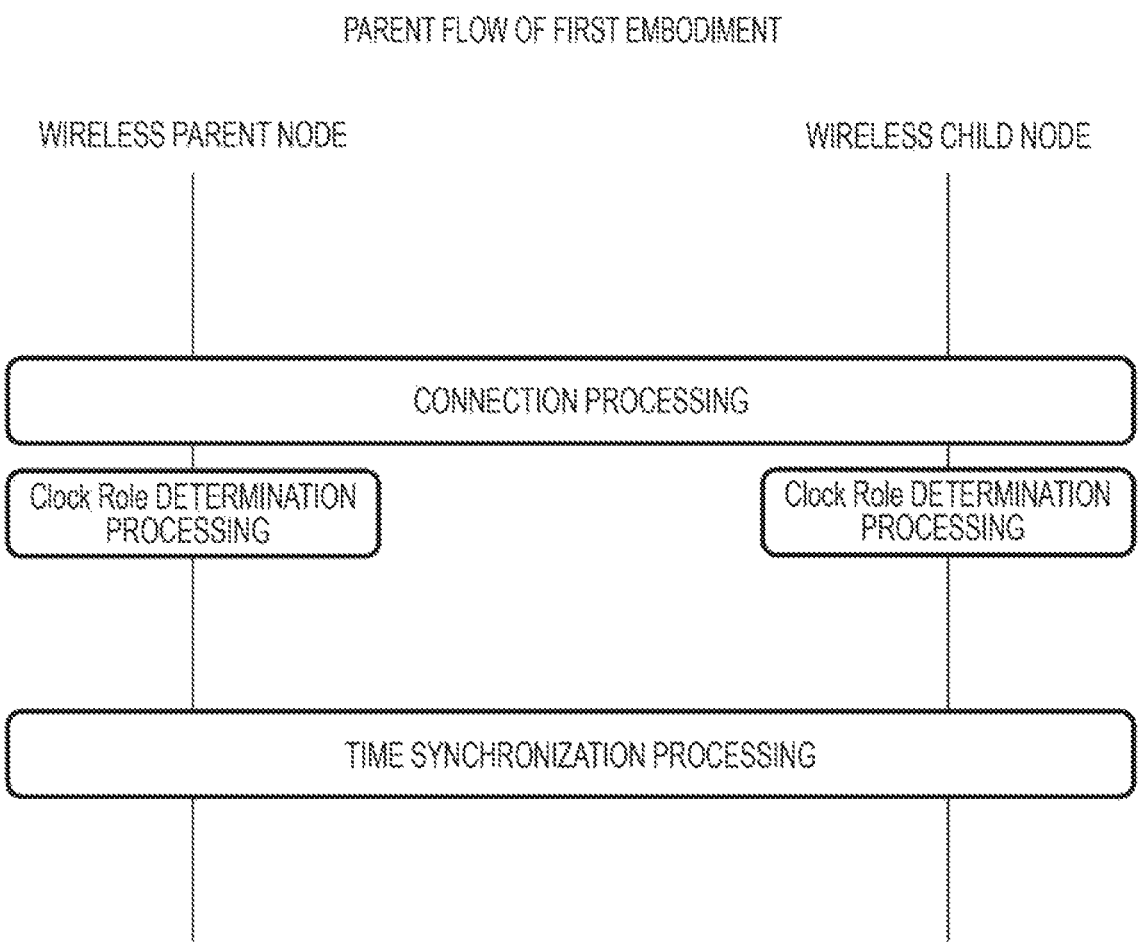
FIG. 8 is a diagram illustrating a parent flow of processings according to a first embodiment.

FIG. 8 illustrates a parent flow of processings according to a first embodiment. The parent flow is configured of three phases including "connection processing," "Clock Role determination processing," and "time synchronization processing." The contents of the respective phases will be described.

[Connection Processing]

Though not described in detail, the connection processing is for general wireless LAN. "SCAN," "Authentication," "Association", and "4-way Handshake" correspond thereto in the infrastructure mode.

[Clock Role Determination Processing]

Figure 9:
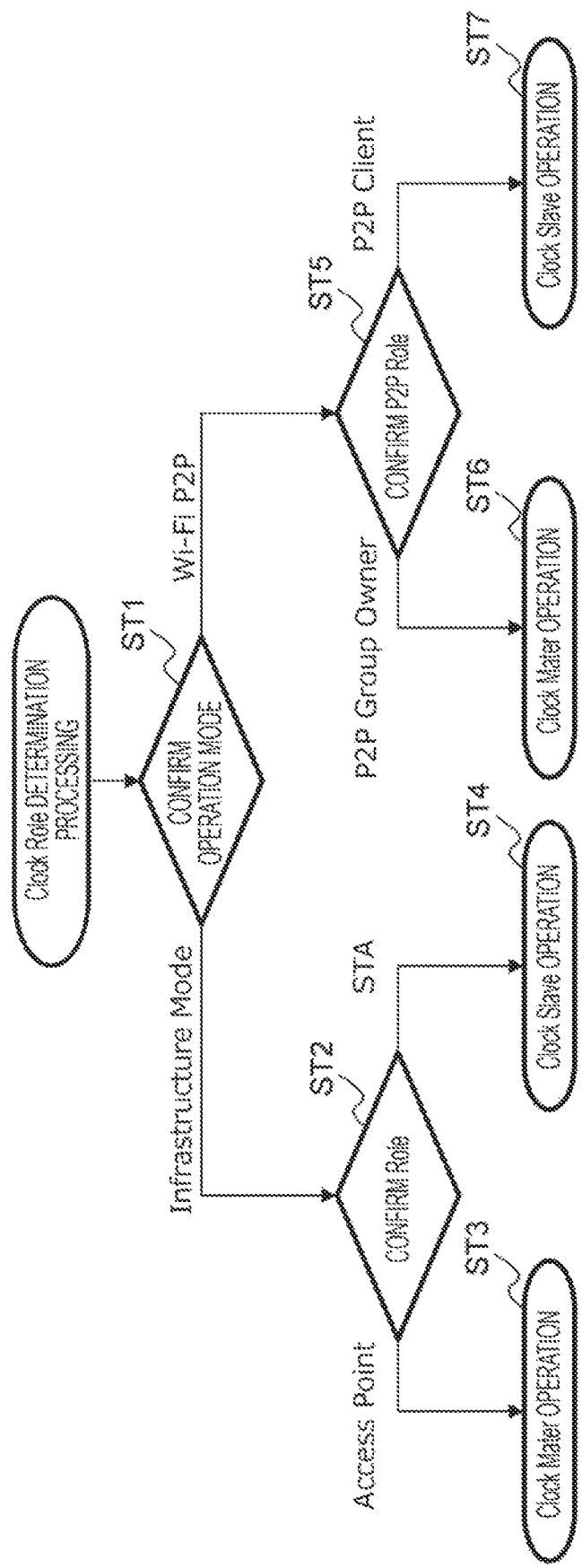
FIG. 9 is a diagram illustrating a flow of a Clock Role determination processing according to the first embodiment.

The Clock Role determination processing is directed for determining whether a self-terminal (self-apparatus) operates as clock master or clock slave. FIG. 9 illustrates a flow of the Clock Role determination processing according to the first embodiment.

(1) In step ST1, a determination is made as to whether an operation mode in the currently-participating wireless LAN network is the infrastructure mode or Wi-Fi P2P.

(2) When the operation mode is the infrastructure mode, in step ST2, a determination is made as to whether the self-terminal operates as access point or station (STA). In a case where the self-terminal operates as access point, in step ST3, the self-terminal determines to operate as clock master, and in a case where the self-terminal operates as station, in step ST4, the self-terminal determines to operate as clock slave.

(3) On the other hand, when the operation mode is Wi-Fi P2P, in step ST5, a determination is made as to whether the self-terminal operates as P2P group owner or P2P client. In a case where the self-terminal operates as P2P group owner, in step ST6, the self-terminal determines to operate as clock master, and in a case where the self-terminal operates as P2P client, in step ST7, the self-terminal determines to operate as clock slave.

[Time Synchronization Processing]

The time synchronization processing is directed for calculating a time offset with a communication party and performing time synchronization according to the determination in the Clock Role determination processing described above. In a case where the time synchronization processing is performed in the layer 3 (network layer, mainly IP layer) and its upper layers, the time synchronization processing (see FIG. 1) in the above PTP protocol is performed, and in a case where the self-terminal is a clock slave, the clock value (system clock value) is corrected as needed according to the calculated time offset. When the clock slave receives the Delay_Response frame, the information required for calculating the time offset with the party is obtained.

A method using frame exchange in the layer 2 (datalink layer, corresponding to MAC layer in the case of wireless LAN) is also present for calculating a time offset. In this case, the fine timing measurement (FTM) protocol defined in the IEEE802.11 standard is used.

Figure 10:
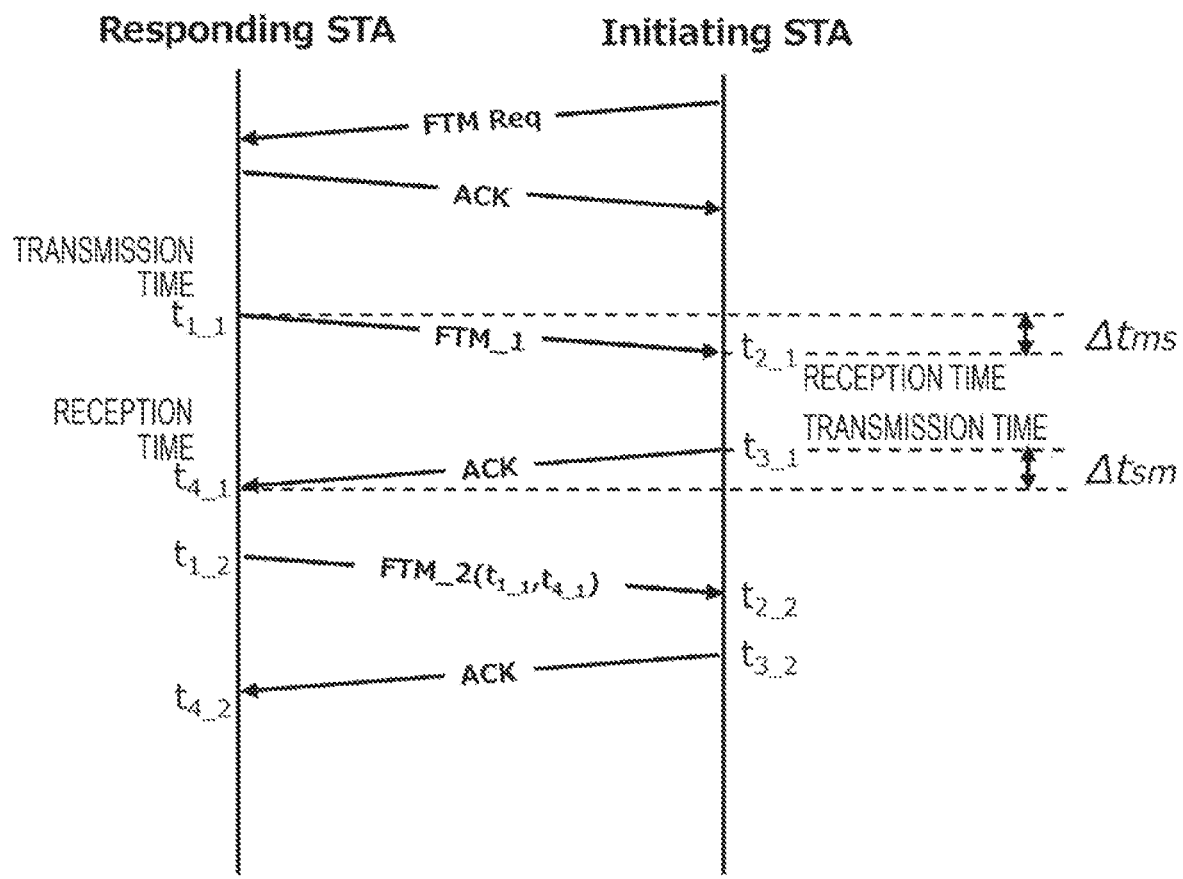
FIG. 10 is a diagram illustrating an operation outline of a FTM protocol.

FIG. 10 illustrates an operation outline of the FTM protocol. A time offset between the clock master (Responding STA in the Figure) and the clock slave (Initiating STA in the Figure) is similarly acquired by replacing t1 to t4 with t1_1 to t1_4 in the above Equation (3). In this case, when the clock slave (Initiating STA) receives the FTM _2 frame, the information required for calculating the time offset with the party is obtained. The sequence may be repeatedly performed several times to make calculations with a plurality of sets of t1_1 to t1_4, thereby enhancing the accuracy.

According to the first embodiment, the parent node as clock master in the wireless network performs the time synchronization processing. Thus, the time offset observation accuracy can be enhanced, thereby enhancing the time synchronization accuracy between a plurality of wireless apparatuses in the wireless network.

Second Embodiment

Figure 11:
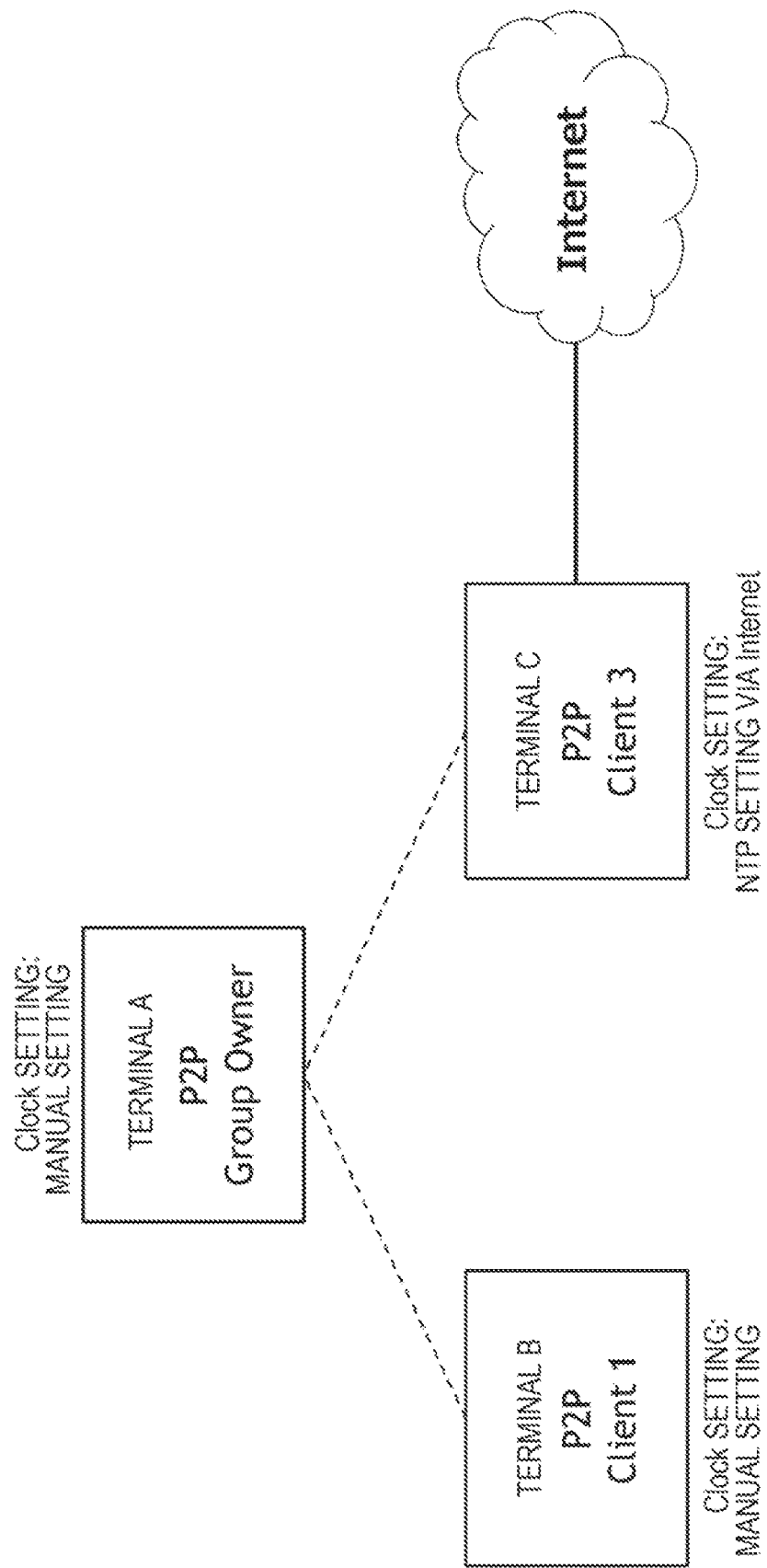
FIG. 11 is a diagram illustrating an exemplary topology (an exemplary case in which a clock accuracy of wireless child nodes is better than that of a wireless parent node) in which a plurality of child nodes are connected to a parent node via Wi-Fi P2P.

The clock accuracy of a child node may be higher than that of a parent node in the parent node and the child node which are in wireless LAN connection. For example, a topology as illustrated in FIG. 11 is possible. In this case, the terminal C is connected to the Internet via another interface, and holds a higher-accuracy (more-excellent) clock by network time protocol (NTP). On the other hand, the terminal A as wireless parent node is not connected to the outside, and a clock value having no relationship with the outside is manually set.

In this case, if the terminal A is forcibly assumed as clock master and the terminals B and C synchronize therewith as in the first embodiment, synchronization between the terminals can be realized, but the synchronization is performed at different times from the outside, and the clock accuracy of the terminal C can be deteriorated. According to the second embodiment, there is provided a mechanism for realizing preferable time synchronization between wireless terminals while preventing a large deterioration in clock accuracy even in the case.

Figure 12:
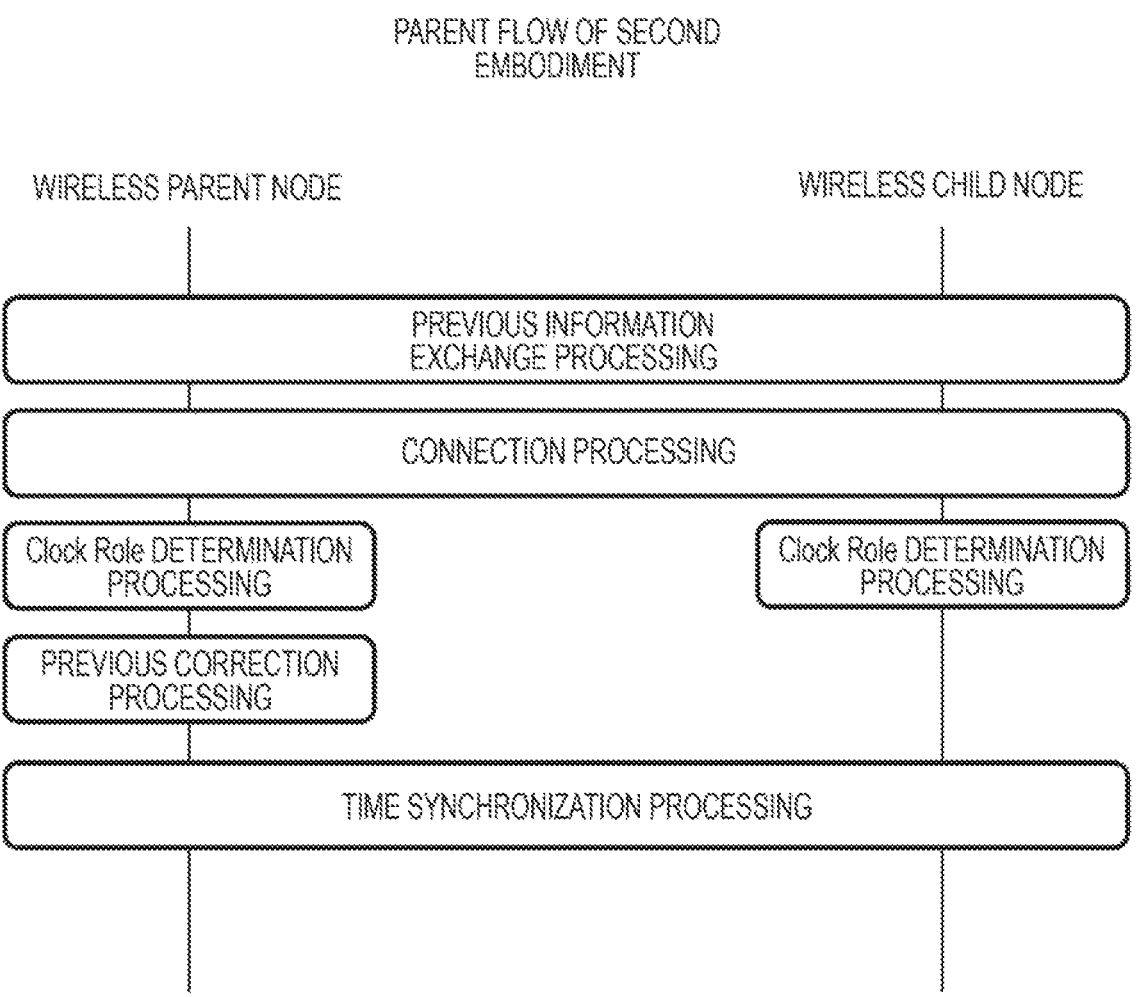
FIG. 12 is a diagram illustrating a parent flow of processings according to a second embodiment.

FIG. 12 is a parent flow of processings according to the second embodiment. The parent flow is configured of five phases including "previous information exchange processing," "connection processing," "Clock Role determination processing," "previous correction processing," and "time synchronization processing." The contents of the respective phases will be described.

[Previous Information Exchange Processing]

Figure 13:
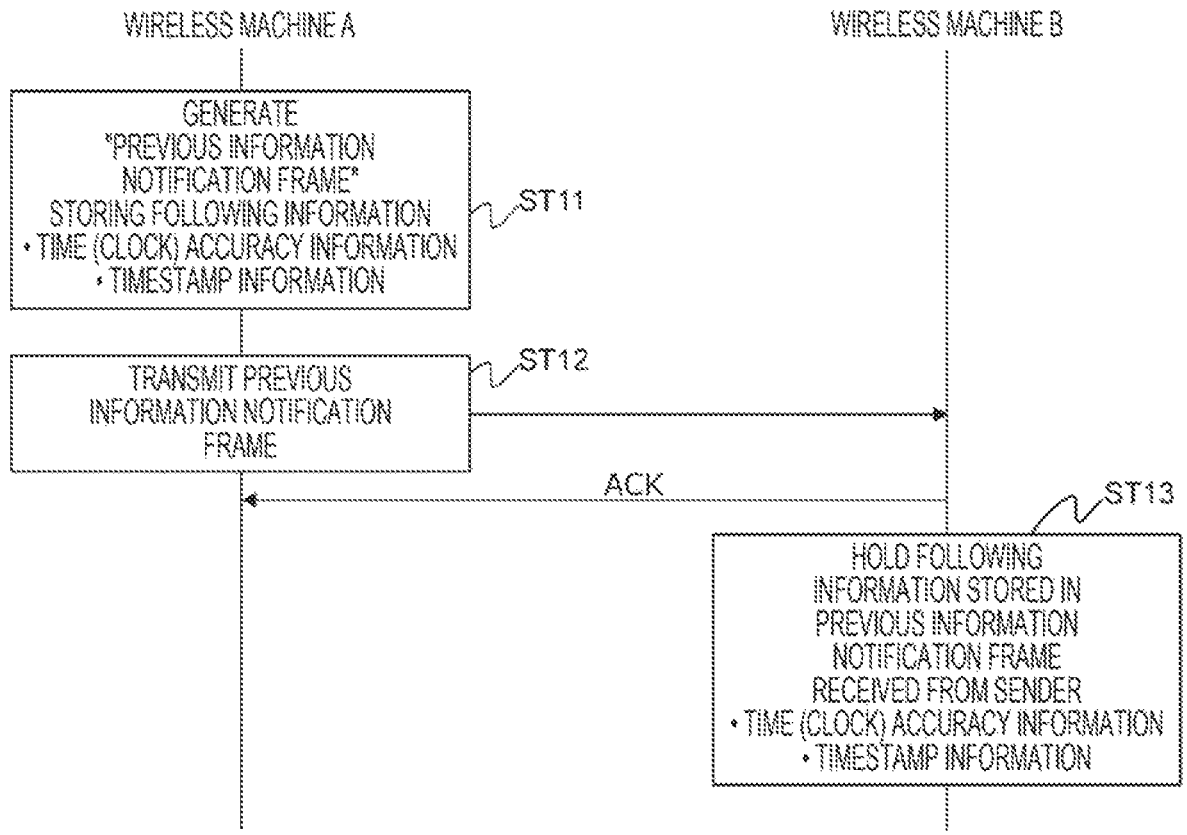
FIG. 13 is a diagram illustrating a flow of a previous information exchange processing according to the second embodiment.

FIG. 13 illustrates a flow of the previous information exchange processing according to the second embodiment. In this case, clock accuracy information and timestamp information (system clock value) are exchanged between the respective terminals. The example of FIG. 13 illustrates that information is transmitted from a wireless machine A to a wireless machine B. In step ST11, the wireless machine A generates a previous information notification frame storing the clock accuracy information and the timestamp information. Then in step ST12, the wireless machine A sends the previous information notification frame to the wireless machine B. In step ST13, the wireless machine B holds the clock accuracy information and the timestamp information stored in the previous information notification frame received from the wireless machine A.

Here, the clock accuracy information indicates which the clock of a self-apparatus is set or updated with reference to, such as timeSource information in the IEEE1588 standard. Table 2 indicates the timeSource values defined in the IEEE1588 standard. In Table 2, a lower value indicates a higher accuracy.

TABLE 2

IEEE1588 timeSource values

| Value (hex) | Source of clock setting |
| --- | --- |
| 0x10 | ATOMIC_CLOCK |
| 0x20 | GPS |
| 0x30 | TERRESTRIAL_RADIO |
| 0x40 | PTP |
| 0x50 | NTP |
| 0x60 | HAND_SET |
| 0x90 | OTHER |
| 0xA0 | INTERNAL_OSCILLATOR |
| 0xF0-0xFE | For use by alternate PTP profiles |
| 0xFF | reserved |

In a case where each terminal sets the timeSource value according to the definition, only the terminal C takes "NTP," and the terminal A and the terminal B take "HAND_SET" or "INTERNAL_OSCILLATOR" in the case of FIG. 11. Each terminal employs the value as "clock accuracy information" described above. Further, each terminal acquires the clock value of self-apparatus corresponding to a timing to transmit the information (the clock accuracy information and the timestamp information). Each terminal employs the value as "timestamp information" described above.

Each terminal stores the two items of information in the previous information notification frame for transmission. The description will be made herein assuming that the previous information notification frame is realized as IEEE802.11 Public Action frame. FIG. 14A illustrates an exemplary format of the previous information notification frame in this case. The clock accuracy information is stored in the Clock Accuracy Information field in FIG. 14A.

Additionally, the previous information notification frame does not necessarily need to be realized by the Public Action frame. For example, it may be mounted as Information Element on part of the Association Request frame to be notified. FIG. 14B illustrates an exemplary format in this case. Similarly, it may be transmitted in other Management frames such as Association Response, Probe Response, Beacon, and Authentication frames.

A terminal which receives the information saves the clock accuracy information and the timestamp information together with the transmission source MAC address in association with the transmission source identifier.

[Connection Processing]

Though not described in detail, the connection processing is for general wireless LAN. "Scan," "Authentication," "Association", and "4-way Handshake" correspond thereto in the infrastructure mode. In a case where the Association Request/Response frame is used for the previous information notification frame, the previous information exchange processing is included in the present processing.

[Clock Role Determination Processing]

The Clock Role determination processing is directed for determining whether a self-terminal (self-apparatus) operates as clock master or clock slave. Though not described in detail, it is similar to the Clock Role determination processing according to the first embodiment.

[Previous Correction Processing]

A time (clock) previous correction processing is performed after Clock Role determination. The processing is performed only by a wireless parent node (access point in the infrastructure mode or P2P group owner in Wi-Fi P2P). At this time, the wireless parent node is determined to operate as clock master.

Figure 15:
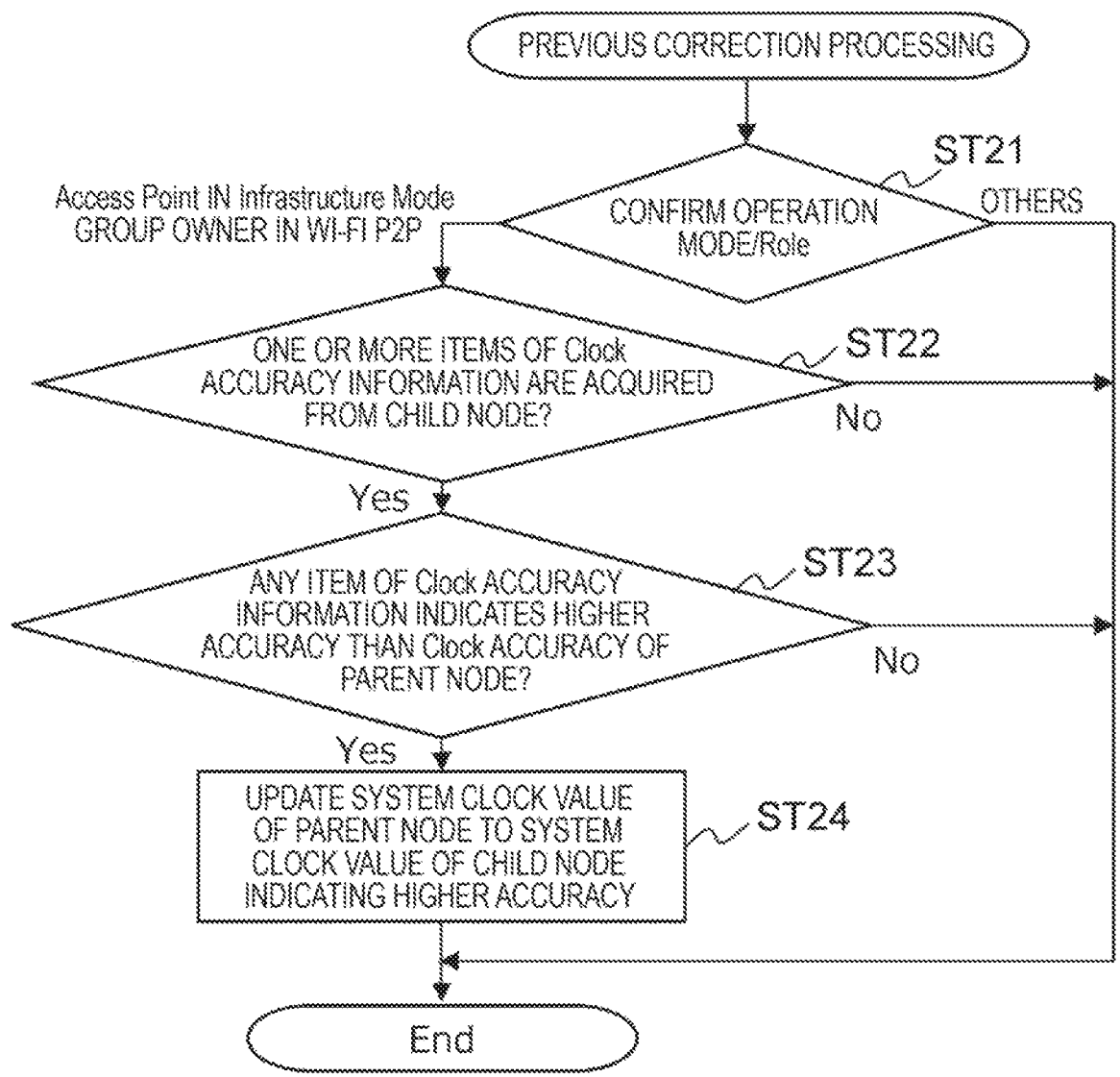
FIG. 15 is a diagram illustrating a flow of a previous correction processing according to the second embodiment.

FIG. 15 illustrates a flow of the previous correction processing. The terminal confirms an operation mode and a role in step ST21. When being an access point in the infrastructure mode or P2P group owner in Wi-Fi P2P, in step ST22, the terminal determines whether one or more items of clock accuracy information are acquired from a child node.

When one or more items of clock accuracy information are present, in step ST23, the terminal determines whether the clock accuracy indicated by the clock accuracy information is higher (more excellent) than its clock accuracy. When a higher accuracy is indicated, in step ST24, the terminal updates its system clock value (time) to the system clock value of the child node indicating the higher accuracy on the basis of the timestamp information. Here, the wireless parent node may update its system clock value after acquiring the timestamp information from the wireless child node again via communication at this time.

[Time Synchronization Processing]

The time synchronization processing is directed for calculating a time offset with a communication party for synchronization according to the determination in the Clock Role determination processing described above. Though not described in detail, it is similar to the time synchronization processing according to the first embodiment described above.

According to the second embodiment, the parent node as clock master in a wireless network performs the time synchronization processing. Therefore, the time offset observation accuracy can be enhanced, and thus the time synchronization accuracy between a plurality of wireless apparatuses in the wireless network can be enhanced. Further, according to the second embodiment, in a case where the clock accuracy of the child node as clock slave is higher than the clock accuracy of the parent node as clock master, the clock value of the parent node is corrected and then the time synchronization processing is performed. Thus, the possibilities that a wireless network is synchronized at a largely-different time from an outside time can be reduced.

2. Variant

Additionally, the timeSource value is used as "clock accuracy information" according to the above embodiments, and additionally any of priority 1, priority 2, clockClass, and clockAccuracy in the IEEE1588 standard, or a combination thereof may be used therefor. priority 1 and priority 2 are a user freely-settable value between 0 and 255. A low value is prioritized. A default value of 128 is defined for default PTP profile.

clockClass is an attribute for defining traceability of the clock relative to the international standard time, and a method for setting the value is described in Table5 in the IEEE1588 specification. clockAccuracy is an attribute for defining the clock accuracy, and a method for setting the value is described in Table6 in the IEEE1588 specification.

Further, the present technology can take the following configurations.

(1) A wireless apparatus including:
a time synchronization processing part configured to perform a time synchronization processing between a self-apparatus and other apparatus configuring a wireless network together with the self-apparatus; and
a parent/child determination part configured to determine whether the self-apparatus is a parent node or a child node in the wireless network,
in which the time synchronization processing part performs the time synchronization processing as a clock master for a child node under control when the self-apparatus is a parent node, and performs the time synchronization processing as a clock slave for a parent node when the self-apparatus is a child node.

(2) The wireless apparatus according to (1),
in which the wireless network is a Wi-Fi P2P network in which a P2P group owner as the parent node and a P2P client as the child node are present.

(3) The wireless apparatus according to (1),
in which the wireless network is a network in an infrastructure mode in which an access point as the parent node and a station as the child node are present.

(4) The wireless apparatus according to any of (1) to (3),
in which the time synchronization processing is a time synchronization processing in the IEEE1588 precision time protocol (PTP) protocol.

(5) The wireless apparatus according to any of (1) to (3),
in which the time synchronization processing is a time synchronization processing in the IEEE802.11 fine timing measurement (FTM) protocol.

(6) The wireless apparatus according to any of (1) to (5), further including:
an information reception part configured to receive clock accuracy information and timestamp information sent from the other apparatus,
in which in a case where determining that a clock accuracy of the other apparatus is higher than a clock accuracy of the self-apparatus on the basis of the clock accuracy information sent from the other apparatus when the self-apparatus is a parent node, the time synchronization processing part corrects a clock value of the self-apparatus by use of the timestamp information sent from the other apparatus, and then performs the time synchronization processing.

(7) The wireless apparatus according to (6),
in which the clock accuracy information and the timestamp information are stored and transmitted in the IEEE802.11 Public Action Frame.

(8) The wireless apparatus according to (6),
in which the clock accuracy information and the timestamp information are stored and transmitted in the IEEE802.11 Association Request Frame.

(9) The wireless apparatus according to any of (1) to (8), further including:
an information transmission part configured to transmit clock accuracy information and timestamp information to the other apparatus,
in which when the self-apparatus is a child node, clock accuracy information and timestamp information of the self-apparatus are transmitted to other apparatus.

(10) The wireless apparatus according to (9),
in which the clock accuracy information and the timestamp information are stored and transmitted in the IEEE802.11 Public Action Frame.

(11) The wireless apparatus according to (9),
in which the clock accuracy information and the timestamp information are stored and transmitted in the IEEE802.11 Association Request Frame.

(12) The wireless apparatus according to any of (9) to (11),
in which the clock accuracy information indicates which a clock of the self-apparatus is set or updated with reference to.

(13) The wireless apparatus according to any of (9) to (11),
in which the timestamp information indicates a clock value of the self-apparatus corresponding to a timing of the transmission.

(14) A wireless apparatus processing method including:
a time synchronization processing step of performing by a time synchronization processing part a time synchronization processing between a self-apparatus and other apparatus configuring a wireless network together with the self-apparatus; and
a parent/child determination step of determining by a parent/child determination part whether the self-apparatus is a parent node or a child node in the wireless network,
in which the time synchronization processing is performed as a clock master for a child node under control when the self-apparatus is a parent node, and the time synchronization processing is performed as a clock slave for a parent node when the self-apparatus is a child node in the time synchronization processing step.

(15) A program for causing a computer provided in a wireless apparatus to function as:
a time synchronization processing unit configured to perform a time synchronization processing between a self-apparatus and other apparatus configuring a wireless network together with the self-apparatus; and
a parent/child determination unit configured to determine whether the self-apparatus is a parent node or a child node in the wireless network,
in which the time synchronization processing unit performs the time synchronization processing as a clock master for a child node under control when the self-apparatus is a parent node, and performs the time synchronization processing as a clock slave for a parent node when the self-apparatus is a child node.

REFERENCE SIGNS LIST

100 Terminal (wireless apparatus)
101 Media control part
102 Wireless communication part
103 User interface part
104 Main control part
105 Memory

The invention claimed is:

1. A wireless apparatus, comprising:
 circuitry configured to:
 perform a time synchronization processing between the wireless apparatus and a communication apparatus, wherein the communication apparatus configures a wireless network together with the wireless apparatus; and
 determine whether the wireless apparatus is a parent node or a child node in the wireless network;
 perform the time synchronization processing as a clock master for the child node under control based on the determination that the wireless apparatus is the parent node;
 perform the time synchronization processing as a clock slave for the parent node based on the determination that the wireless apparatus is the child node; and
 transmit clock accuracy information and timestamp information to the communication apparatus based on the determination that the wireless apparatus is the child node.

2. The wireless apparatus according to claim 1, wherein the wireless network is a Wi-Fi P2P network, and
 the Wi-Fi P2P network comprises a P2P group owner as the parent node and a P2P client as the child node.

3. The wireless apparatus according to claim 1, wherein the wireless network is a network in an infrastructure mode, and
 the network comprises an access point as the parent node and a station as the child node.

4. The wireless apparatus according to claim 1, wherein the time synchronization processing is in an IEEE1588 precision time protocol (PTP).

5. The wireless apparatus according to claim 1, wherein the time synchronization processing is in an IEEE802.11 fine timing measurement (FTM) protocol.

6. The wireless apparatus according to claim 1, wherein the circuitry is further configured to:
 receive the clock accuracy information and the timestamp information from the communication apparatus;
 determine a clock accuracy of the communication apparatus is higher than a clock accuracy of the wireless apparatus based on the clock accuracy information; and
 correct a clock value of the wireless apparatus by the timestamp information based on the determination that the clock accuracy of the communication apparatus is higher than the clock accuracy of the wireless apparatus and based on the determination that the wireless apparatus is the parent node.

7. The wireless apparatus according to claim 6, wherein the circuitry is further configured to control to store and transmit the clock accuracy information and the timestamp information in an IEEE802.11 Public Action Frame.

8. The wireless apparatus according to claim 6, wherein the circuitry is further configured to control to store and transmit the clock accuracy information and the timestamp information in an IEEE802.11 Association Request Frame.

9. The wireless apparatus according to claim 1, wherein the circuitry is further configured to control to store and transmit the clock accuracy information and the timestamp information in an IEEE802.11 Public Action Frame.

10. The wireless apparatus according to claim 1, wherein the circuitry is further configured to control to store and transmit the clock accuracy information and the timestamp information in an IEEE802.11 Association Request Frame.

11. The wireless apparatus according to claim 1, wherein the clock accuracy information indicates at least one of set or update of a clock of the wireless apparatus.

12. The wireless apparatus according to claim 1, wherein the timestamp information indicates a clock value of the wireless apparatus that corresponds to a timing of the transmission of the clock accuracy information and the timestamp information.

13. A wireless apparatus processing method, comprising:
 performing a time synchronization processing between a wireless apparatus and a communication apparatus, wherein the communication apparatus configures a wireless network together with the wireless apparatus; and
 determining whether the wireless apparatus is a parent node or a child node in the wireless network;
 performing the time synchronization processing as a clock master for the child node under control based on the determination that the wireless apparatus is the parent node;
 performing the time synchronization processing as a clock slave for the parent node based on the determination that the wireless apparatus is the child node; and
 transmitting clock accuracy information and timestamp information to the communication apparatus based on the determination that the wireless apparatus is the child node.

14. A non-transitory computer-readable medium having stored thereon, computer executable instructions, which when executed by a computer, cause the computer to execute operations, the operations comprising:
 performing a time synchronization processing between a wireless apparatus and a communication apparatus, wherein the communication apparatus configures a wireless network together with the wireless apparatus; and
 determining whether the wireless apparatus is a parent node or a child node in the wireless network;
 performing the time synchronization processing as a clock master for the child node under control based on the determination that the wireless apparatus is the parent node;
 performing the time synchronization processing as a clock slave for the parent node when the wireless apparatus is the child node; and
 transmitting clock accuracy information and timestamp information to the communication apparatus based on the determination that the wireless apparatus is the child node.

15. A wireless apparatus, comprising:
 circuitry configured to:
 perform a time synchronization processing between the wireless apparatus and a communication apparatus, wherein the communication apparatus configures a wireless network together with the wireless apparatus; and
 determine whether the wireless apparatus is a parent node or a child node in the wireless network;

perform the time synchronization processing as a clock master for the child node under control based on the determination that the wireless apparatus is the parent node;
perform the time synchronization processing as a clock slave for the parent node based on the determination that the wireless apparatus is the child node;
receive clock accuracy information and timestamp information from the communication apparatus;
determine a clock accuracy of the communication apparatus is higher than a clock accuracy of the wireless apparatus based on the clock accuracy information; and
correct a clock value of the wireless apparatus by the timestamp information based on the determination that the clock accuracy of the communication apparatus is higher than the clock accuracy of the wireless apparatus and based on the determination that the wireless apparatus is the parent node.

* * * * *